UNITED STATES PATENT OFFICE.

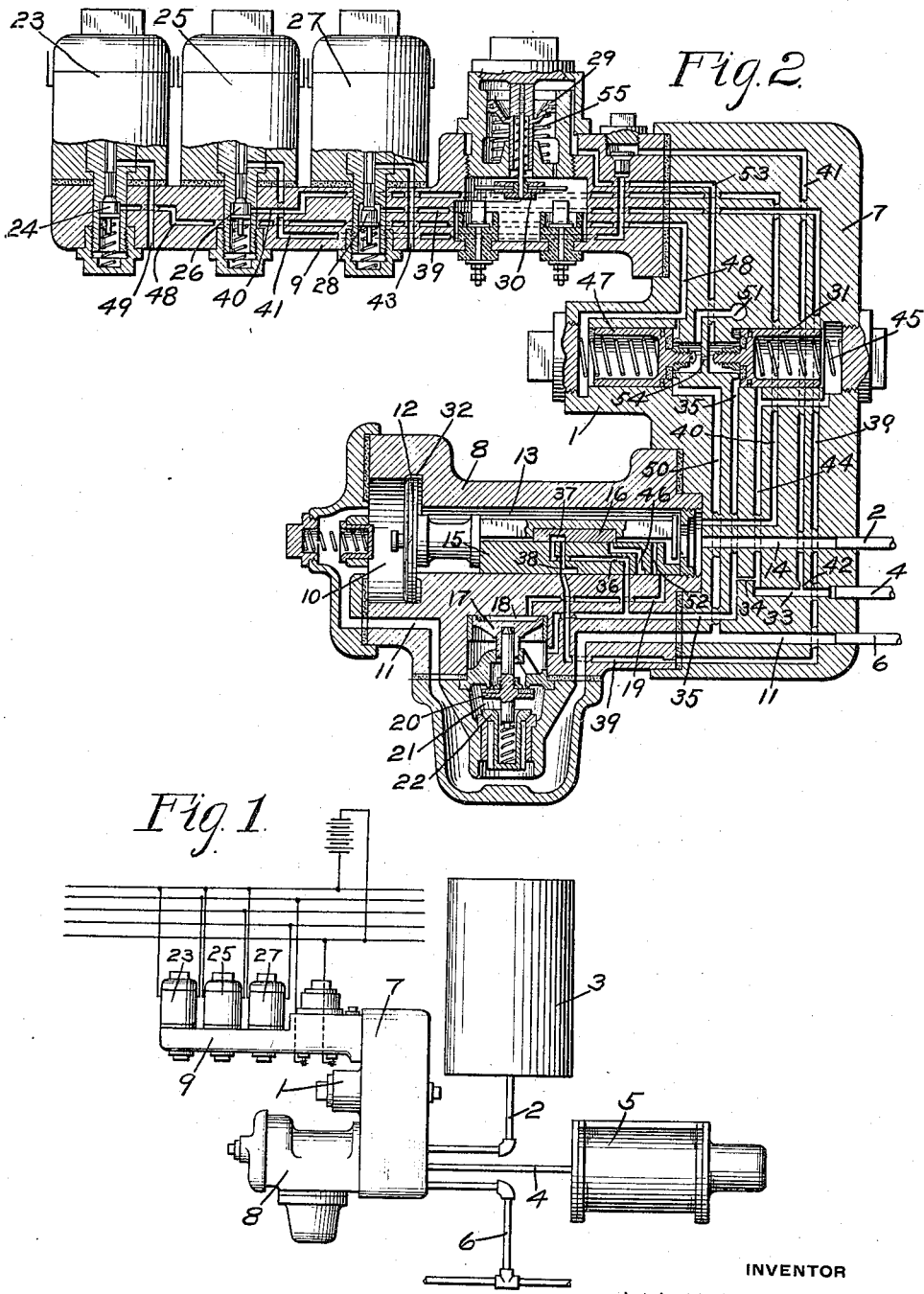

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,281,431.  Specification of Letters Patent.  Patented Oct. 15, 1918.

Application filed February 3, 1917. Serial No. 146,397.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-fluid-pressure brakes, in which the brakes can be controlled either by variations in fluid under pressure or electrically.

It has been proposed to provide an electro-fluid-pressure brake equipment in which an emergency magnet device is provided on each vehicle of the train for locally venting fluid from the brake pipe to obtain a simultaneous emergency reduction in brake pipe pressure throughout the train.

With the above equipment, the brakes may also be operated by varying the pressure in the brake pipe, independently of any electric control, and in this connection, it has been proposed to provide an emergency switch device in the circuit of the emergency magnets, which is adapted to be operated upon a sudden reduction in brake pipe pressure for closing the emergency magnet circuit and thus effecting the same simultaneous action throughout the train when the brakes are operated by fluid under pressure as when operated electrically.

A quick action valve device is also provided on each vehicle for locally reducing the brake pipe pressure when the electric control becomes inoperative for any reason.

The principal object of my invention is to provide an electro-fluid-pressure brake apparatus of the above character adapted to be employed in connection with triple valve devices of types heretofore employed.

In the accompanying drawing; Figure 1 is a diagrammatic view of an electro-fluid-pressure brake equipment embodying my invention, and Fig. 2 a central sectional view of the brake controlling valve device.

As shown in Fig. 1 of the drawings, the equipment may comprise a brake controlling valve device 1, connected by pipe 2 to an auxiliary reservoir 3, by pipe 4 to brake cylinder 5, and having a brake pipe connection 6.

The brake controlling valve device may comprise a pipe bracket member 7 having secured thereto a triple valve device 8 and an electro-fluid pressure section 9.

The triple valve device 8 may comprise a casing having a piston chamber 10, connected by passage 11 to brake pipe 6 and containing a piston 12, and a valve chamber 13 connected by passage 14 to auxiliary reservoir pipe 2 and containing a main slide valve 15 and a graduating slide valve 16 adapted to be operated by piston 12.

Within the triple valve casing, there is also contained a quick action valve device comprising a piston 17 contained in piston chamber 18 connected to passage 19 leading to the seat of main slide valve 15 and a quick action valve 20 contained in valve chamber 21 which is adapted to communicate with the brake pipe when the usual brake pipe check valve 22 opens.

The electro-fluid pressure section 9 comprises an emergency magnet 23 for operating a valve 24, a service magnet 25 for operating a valve 26, a release magnet 27 for operating a valve 28 and an emergency switch device having a piston 29 for operating a switch 30 which controls the circuit of emergency magnet 23.

According to my invention, the emergency switch piston is operated by fluid from the brake cylinder, and in order to prevent operation except in an emergency application of the brakes, a valve piston 31 is provided for controlling communication to the emergency switch piston and this piston is adapted to open only when the flow of fluid to the brake cylinder is at an emergency rate.

In operation, fluid supplied to the brake pipe 6 flows through passage 11 to piston chamber 10 of the triple valve device, and hence through the usual feed groove 32 to valve chamber 13 and the auxiliary reservoir 3.

In release, the brake cylinder is connected to the exhaust through pipe 4, passage 33, restricted passage 34, port 36 in slide valve 15, cavity 37 in graduating valve 16, port 38, and passage 39, past the open electric release valve 28 to exhaust port 43.

In order to effect an electric service application of the brakes, the release magnet 27 is energized to close the valve 28 and thus cut off the exhaust from the brake cylinder and the service magnet 25 is energized to open the electric service valve 26 and permit the flow of fluid from the auxiliary reservoir to the brake cylinder through passage 40, past valve 26 to passage 41, and thence through a restricted portion 42, to brake cylinder passage 33.

Fluid supply to the brake cylinder also flows through passage 35 to the outer seated area of the valve piston 31 and also through passage 44 to the opposite side of said valve piston, but since the rate of flow to the face of the valve piston is limited by the restricted passage 34 the valve piston 31 will be held seated by spring 45.

A fluid pressure service application of the brakes may be effected by a gradual reduction in brake pipe pressure, which causes the triple valve piston 12 to move out to service position and thereby effect the supply of fluid from the auxiliary reservoir to the brake cylinder through service port 46 to passage 35 and thence through the restricted passage 34 to the brake cylinder passage 33. As in the case of an electric service application, the rate of flow to the brake cylinder is not sufficiently rapid to effect the movement of the valve piston 31.

If an emergency application of the brakes is effected electrically, the emergency magnet 23 is energized to open valve 24 so as to vent fluid from the outer face of a relay valve piston 47, through passage 48 to exhaust port 49, so that brake pipe pressure which acts on the outer exposed area of the opposite face of said piston through passage 50, operates to shift same and thereby connect the brake pipe with an exhaust port 51. The sudden reduction in brake pipe pressure thus produced then causes the movement of the triple valve piston 12 to emergency position in which slide valve 15 uncovers passage 19, so that fluid from the auxiliary reservoir is admitted to the quick action piston 18 and passage 35 is connected to a large emergency supply port 52. Fluid is now supplied from the auxiliary reservoir at a rate exceeding the capacity of the restricted port 34. The pressure then builds up on the outer seated area of valve piston 31 sufficiently to overcome the opposing pressure on the opposite side and thus forces the valve piston from its seat. Fluid can now flow through passage 53 to switch piston 29 operating same to close the switch 30. The opening of the valve piston 31 also directly connects passage 35 with passage 44, so that fluid can flow rapidly to the brake cylinder to effect an emergency application of the brakes.

When the auxiliary reservoir pressure has substantially equalized into the brake cylinder, the spring 45 seats the valve piston 31 and fluid on piston 29 escapes through a restricted port 54 to exhaust port 51. The piston 29 is then moved to release position by spring 55, thus opening the emergency switch 30, so that when the brake valve is moved to effect the release of the brakes, the emergency magnets will all be deënergized and the valve 24 closed, insuring that fluid will not be vented from the brake pipe through an open emergency valve 24 so as to interfere with the recharging of the brake pipe by the operation of the brake valve.

If an emergency application of the brakes is initiated pneumatically, that is, by directly effecting a sudden reduction in brake pipe pressure, the triple valve piston 12 will be shifted to emergency position to supply fluid to the brake cylinder and to the switch piston 29, the same as in an electric emergency and the closing of switch 30 operates to energize the emergency magnet circuit, so that all of the emergency magnets throughout the train are energized to effect a simultaneous application of the brakes.

If the electric ports should be inoperative, the ordinary quick action is propagated as heretofore by the operation of the quick action piston 17.

Having now described my invention, what I claim as new and desire to secure by Letters Patent is:

1. In an electro-fluid pressure brake, the combination with electrically controlled means for effecting an application of the brakes and an electric switch device for controlling the circuit of said means, of a valve device subject to the flow of fluid to the brake cylinder in a service application of the brakes and operated by the pressure of fluid supplied to the brake cylinder in an emergency application of the brakes for controlling the supply of fluid for operating said switch device.

2. In an electro-fluid pressure brake, the combination with a brake cylinder, a magnet valve device for effecting an emergency application of the brakes, and an emergency switch device for controlling the emergency magnet circuit, of a valve device subject to the pressure of fluid supplied to the brake cylinder in a service application of the brakes but operated only by the flow of fluid to the brake cylinder at an emergency rate for opening communication for supplying fluid to operate said switch device.

3. In an electro-fluid pressure brake, the combination with a brake cylinder, a magnet valve device for effecting an emergency application of the brakes, and an emergency switch device for controlling the emergency magnet circuit, of a valve device subject on one side to brake cylinder pressure for controlling the supply of fluid for operating said switch device, a restricted port through which fluid is supplied to the brake cylinder in a service application of the brakes, said valve device being operated by the flow of fluid to the brake cylinder in an emergency application of the brakes.

4. In an electro-fluid pressure brake, the combination with a brake cylinder, a magnet valve device for effecting an emergency application of the brakes, and an emergency switch device for controlling the emergency magnet circuit, of a valve device subject on one side to brake cylinder pressure for controlling the supply of fluid for operating said switch device, a restricted port through which fluid is supplied to the brake cylinder in a service application of the brakes, said valve device being operated by the flow of fluid to the opposite side in an emergency application of the brakes for opening a large port to the brake cylinder and for opening communication for supplying fluid to the switch device.

5. In an electro-fluid pressure brake, the combination with a brake cylinder, a brake pipe, and a triple valve device having a quick action valve mechanism adapted to vent fluid from the brake pipe to the brake cylinder, of electrically controlled means for effecting an emergency application of the brakes, a switch device for controlling the circuit of said means, and a valve device subject to the pressure of fluid supplied to the brake cylinder in a service application of the brakes but operating only in an emergency application of the brakes for opening communication for supplying fluid to operate said switch device.

6. In an electro-fluid pressure brake, the combination with a brake cylinder, a brake pipe, and a triple valve device having a quick action valve mechanism adapted to vent fluid from the brake pipe to the brake cylinder, of electrically controlled means for effecting an emergency application of the brakes, a switch device for controlling the circuit of said means, and a valve device operating in an emergency application of the brakes for opening communication for supplying fluid to operate said switch device and adapted to close said communication upon equalization of the fluid supply into the brake cylinder.

In testimony whereof I hereunto set my hand.

WALTER V. TURNER.

Copies of this patent may be obtained for five cents each, by addressing the "Commissioner of Patents, Washington, D. C."